(12) United States Patent
Schmitt et al.

(10) Patent No.: US 11,553,708 B2
(45) Date of Patent: Jan. 17, 2023

(54) SYSTEM AND METHOD FOR VITRIFYING A BIOLOGICAL SUBSTANCE

(71) Applicant: IMV TECHNOLOGIES, Saint Ouen sur Iton (FR)

(72) Inventors: Eric Schmitt, Villaines-la-Juhel (FR); Christian Beau, Toussus-le-Noble (FR); Philippe Clairaz, Sceaux (FR); Jean-Louis Douesnel, Breteuil sur Iton (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 679 days.

(21) Appl. No.: 16/492,426

(22) PCT Filed: Mar. 9, 2018

(86) PCT No.: PCT/FR2018/050547
§ 371 (c)(1),
(2) Date: Sep. 9, 2019

(87) PCT Pub. No.: WO2018/162862
PCT Pub. Date: Sep. 13, 2018

(65) Prior Publication Data
US 2020/0037606 A1 Feb. 6, 2020

(30) Foreign Application Priority Data
Mar. 10, 2017 (FR) ...................................... 1751987

(51) Int. Cl.
*A01N 1/02* (2006.01)

(52) U.S. Cl.
CPC ......... *A01N 1/0257* (2013.01); *A01N 1/0268* (2013.01)

(58) Field of Classification Search
CPC ........................... A01N 1/0257; A01N 1/0268
See application file for complete search history.

(56) References Cited

U.S. PATENT DOCUMENTS

| D642,697 S | 8/2011 | Gaefvert |
| 2006/0162652 A1 | 7/2006 | Lang et al. |
| 2014/0157798 A1 | 6/2014 | Jimenez-Rios |

FOREIGN PATENT DOCUMENTS

| DE | 102005003286 A1 | 7/2006 |
| DE | 102014104330 A1 | 10/2015 |
| WO | 9909137 A1 | 2/1999 |

*Primary Examiner* — Lionel Nouketcha
(74) *Attorney, Agent, or Firm* — Browdy and Neimark, P.L.L.C.

(57) ABSTRACT

The invention concerns a cryogenic system (1) for vitrifying a substance comprising biological material to be preserved in a receiving region of a thin tube (8), comprising a tank (10) containing a bath (11) of a cryogenic agent and a support member (80) mounted on said tank in a predetermined first position in which said tube is orientated upright, the receiving region being immersed in a liquid zone (17) of said bath, and an opening of said tube being situated above said bath, in a zone of ambient air above said bath, in order to introduce the substance into the tube, the support member being mounted on said tank in a second predetermined position, in which said receiving region is immersed in the liquid zone and said opening is situated immediately above said liquid zone, in a gaseous zone (18) of said bath above said liquid zone and below said zone of ambient air, and being raised from said second position.

17 Claims, 11 Drawing Sheets

SYSTEM AND METHOD FOR VITRIFYING A BIOLOGICAL SUBSTANCE

FIELD OF THE INVENTION

The invention generally relates to the preservation by cryogenic vitrification of a substance comprising biological material, such as an embryo or an oocyte.

More particularly the invention concerns the systems for vitrification by plunging into a liquid cryogenic agent a packaging casing into which a volume of such a biological substance is introduced in advance.

The invention also concerns the methods for vitrifying such a biological substance using such systems.

TECHNOLOGICAL BACKGROUND

Packaging casings for biological material configured to be plunged into a liquid cryogenic agent conventionally form part of a packaging set comprising, in addition to the casing, a carrier comprising a receiving zone for a volume of substance comprising biological material, such as an embryo or an oocyte.

The casing comprises a thin tube having a predetermined inside diameter, into which the carrier is configured to be inserted. The thin tube is generally formed from a polymer material having the capacity to be easily welded while providing good sealing. The thin tube has an opening at a first end while it has a weld in the neighborhood of the opposite end.

A first known vitrifying system comprises a tub configured to contain a certain volume of liquid nitrogen.

To package the predetermined volume of biological substance, this is deposited beforehand on the carrier, then the carrier is inserted into the thin tube by its opening. A weld is then made in the neighborhood of the first end of the thin tube so as to hermetically seal the casing. The casing welded at both ends is lastly plunged fully, that is to say immersed, in the liquid nitrogen to vitrify the biological substance.

A second known vitrifying system comprises a tub that is also configured to contain a certain volume of liquid nitrogen, and a cover configured to be placed on the tub and comprising a wall extending to be situated over the liquid nitrogen. The cover has cut-outs provided in the wall and each of which is configured to keep the tube of a casing engaged in the cut-out in a substantially vertical orientation.

This second system is illustrated for example in American "design patent" U.S. D642,697 S.

The packaging of the biological substance is carried out in the following way: The thin tube of the casing is engaged in the cut-out of the cover such that the portion of the thin tube receiving the biological substance to vitrify is immersed in the liquid nitrogen, while the end portion of the thin tube comprising the opening is not immersed in the liquid nitrogen and is located above the cover, in the ambient air.

The biological substance is deposited on the carrier, which is inserted into the thin tube by its opening in the ambient air. A weld is then made in the neighborhood of the first end of the thin tube so as to hermetically seal the casing. If need be, the casing welded at both ends may be plunged fully, that is to say immersed, in the liquid nitrogen to vitrify the biological substance.

SUBJECT OF THE INVENTION

The invention is directed to providing a vitrifying system of the same kind as those described above, but which provides better performance, while being simple and convenient to use.

To that end, according to a first aspect, the invention provides a system for cryogenic vitrification of a substance comprising biological material to preserve, such as an embryo or an oocyte, and received in a packaging casing which comprises a thin tube of predetermined dimensions having an opening at a first end and being closed off in the neighborhood of a second end which is an opposite end to said first end, said casing forming part of a packaging set for said substance comprising, in addition to said casing, a receiving carrier configured to receive a predetermined volume of said substance and to be inserted inside said thin tube such that said predetermined volume of said substance is located in a receiving region of said thin tube located at a distance from said opening of said thin tube; said system comprising a tub configured to contain a bath of a cryogenic agent and at least one carrier member configured to hold said thin tube in a predetermined orientation and to be mounted on said tub in a first predetermined position in which said thin tube is uprightly oriented in said tub, said receiving region of said thin tube is immersed in a liquid zone of said bath of cryogenic agent where said cryogenic agent is in the liquid state, and said opening of said thin tube is located above said bath of cryogenic agent, in a zone of ambient air surmounting said bath of cryogenic agent, to enable the insertion of said receiving carrier of said substance into said thin tube; said system being characterized in that said carrier member is configured to be mounted on said tub in at least one second predetermined position, lower than said first predetermined position, in which second predetermined position said thin tube is uprightly oriented in said tub, said receiving region of said thin tube is immersed in said liquid zone, and said opening of said thin tube is located immediately above said liquid zone, in a gaseous zone of said bath of cryogenic agent, surmounting said liquid zone and where said cryogenic agent is in the gaseous state, and below said ambient air zone surmounting said bath of cryogenic agent, and to be raised from said second predetermined position to said first predetermined position.

In the vitrifying system according to the invention, the carrier member is movably mounted on the tub and enables the thin tube of the casing to be placed in two distinct positions on the tub and in relation to the bath of cryogenic agent, in order to ensure cooling of particularly good performance both of the thin tube and of the substance packaged in the thin tube, for the purpose of the preservation of that substance.

In particular, the carrier member is first of all configured to position the thin tube, not having any substance, in its second predetermined position in which the thin tube is fully in contact with the cryogenic agent, partially in the liquid zone of the bath and partially in the gaseous zone of the bath.

The thin tube is thus cooled over its whole length, from the receiving region of the substance to its opening.

The fact that the opening of the thin tube is located in the gaseous zone of the bath of cryogenic agent makes it possible not to fill an interior volume of the thin tube (at least partly dedicated to the substance) with the agent in the liquid state. On the contrary, the cryogenic agent in the gaseous state, which is cooler than the ambient air, flushes the ambient air out of the thin tube by convection.

Thus, the thin tube is cooled by the cryogenic agent not only by direct contact by an outside face of the thin tube with the cryogenic agent in the liquid state and in the gaseous state, but also by the direct contact by an inside face of the thin tube with the cryogenic agent in the gaseous state.

Whereas it may be considered that there is vitrification of the substance when the cooling kinetics have a slope of which the absolute value is greater than approximately 200° C. per minute, or possibly 500° C. per minute, the vitrifying system according to the invention can enable cooling kinetics to be attained for example of the order of 2000 à 3000° C. per minute, for example between an initial temperature of 10° C. and a final temperature of −150° C.

According to simple, convenient and economical features of the system according to the invention:

said system comprises at least one guide rail mechanically connected to said tub, said carrier member being mounted to be movable on said guide rail in a substantially vertical direction to pass from said second predetermined position to said first predetermined position, and vice-versa:

said carrier member comprises at least one positioning projection and said guide rail comprises a first positioning cut-out and a second positioning cut-out each configured to receive said at least one first projection and which respectively define said first predetermined position and said second predetermined position;

said carrier member is slidingly mounted on said guide rail;

said carrier member comprises at least one guide projection and said guide rail comprises at least one guide cut-out extending substantially vertically and at least partly along said guide rail and being configured to slidingly receive said at least one guide projection, when said carrier member is moved from its second predetermined position to its first predetermined position;

the carrier member comprises a U-shaped body that has a back and facing lateral flanges together defining a housing for said thin tube and said casing, which housing is open longitudinally opposite said back through a lateral opening configured to receive said tube uprightly oriented for its insertion into said housing;

said carrier member is provided, towards a lower end, with at least one part for wedging said thin tube and, towards an upper end which is an opposite end to its lower end, with a hook for retaining said thin tube;

said carrier member is configured such that said thin tube is confined in position on said carrier member and at least partly bent longitudinally between said at least one wedging part and said retaining hook;

said system comprises a cover mounted on a rim of said tub and extending to be situated over said liquid zone, and said carrier member is moveably mounted on and through said cover;

said cover is positioned in said gaseous zone of said bath of cryogenic agent;

said tub is provided with an insulating external wall and with a fluid-tight internal wall delimiting at least partly an internal receiving space for the bath of cryogenic agent, said insulating external wall having an internal shoulder provided at the top of said tub, said fluid-tight internal wall having an external extension provided at the top of said tub and disposed bearing on said shoulder of said external wall, said external extension forming said rim of said tub on which is positioned said cover;

said system comprises a multi-compartment goblet configured to transport a plurality of said packaging casings, a receiving carrier at least partly housed in said tub and configured to removably receive said multi-compartment goblet such that at least the receiving region of the thin tube of each of said plurality of packaging casings is immersed in said liquid zone of said bath of cryogenic agent.

said receiving carrier of said multi-compartment goblet is rotatable between a storage position in which said multi-compartment goblet is situated substantially vertically and a filling/emptying position in which said multi-compartment goblet is inclined and immersed in said liquid zone of said bath of cryogenic agent; whereby said system is configured to pass a said packaging casing that is closed off at each of its first and second ends at least from said carrier member to said multi-compartment goblet while remaining mostly immersed in said bath of cryogenic agent;

said system comprises an opening device which is configured to cut said thin tube of said packaging casing, at one of said first and second ends, and which is mounted on said tub near said multi-compartment goblet;

said system comprises a rack mounted on said tub near said opening device and which has a plurality of cut-outs each configured to hold, in an upright position, a thin tube of a said packaging casing, which is open at one of said first and second ends, said rack being configured such that the receiving region of said thin tube is immersed in the liquid zone of said bath of cryogenic agent; and/or said system comprises a checking device for the level of said liquid zone of said bath of cryogenic agent in said tub.

According to a second aspect, the invention is also directed to a method of vitrifying a substance comprising biological material to preserve, such as an embryo or an oocyte, for example in particular using the system as described above, comprising the steps of:

providing a packaging set for said substance comprising a packaging casing having a thin tube of predetermined dimensions having an opening at a first end and being closed off in the neighborhood of a second end that is an opposite end to said first end, and a receiving carrier configured to receive a predetermined volume of said substance and to be inserted inside said thin tube such that said predetermined volume of said substance is located in a receiving region of said thin tube located at a distance from said opening of said thin tube;

providing a tub containing a bath of cryogenic agent;

providing at least one carrier member configured to be mounted on said tub and to hold said thin tube;

placing said thin tube in said carrier member in a predetermined orientation;

mounting said carrier member on said tub in at least one second predetermined position in which said thin tube is uprightly oriented in said tub, said receiving region of said thin tube being immersed in a liquid zone of said bath of cryogenic agent in which the cryogenic agent is in the liquid state, and said opening of said thin tube being located immediately above said liquid zone, in a gaseous zone of said bath of cryogenic agent, surmounting said liquid zone and where said cryogenic agent is in the gaseous state, and below an ambient air zone surmounting said bath of cryogenic agent;

raising said carrier member from said second predetermined position to a first predetermined position, higher than said second predetermined position, in which said thin tube is uprightly oriented in said tub, said receiving region of said thin tube being immersed in said liquid zone, and said opening of said thin tube being located above said bath of cryogenic agent, in an ambient air zone surmounting said bath of cryogenic agent, to enable the insertion of said receiving carrier of said substance into said thin tube;

depositing said substance on said carrier and inserting said carrier into said thin tube; and sealing said thin tube at its second end.

According to simple, convenient and economical features of the method according to the invention:

the method further comprises the steps of providing a multi-compartment goblet configured to transport a plurality of said packaging casings, of removably mounting said multi-compartment goblet in a storage position in which said multi-compartment goblet is situated substantially vertically on a receiving carrier that is at least partly housed in said tub such that at least the receiving region of the thin tube of each of said plurality of said packaging casings is immersed in said liquid zone of said bath of cryogenic agent, rotating said multi-compartment goblet on said carrier from said storage position to a filling/emptying position, in which said multi-compartment goblet is inclined and at least partly immersed in said liquid zone of said bath of cryogenic agent, passing a said packaging casing that is closed off at each of its first and second ends at least from said carrier member to said multi-compartment goblet while remaining mostly immersed in said bath of cryogenic agent; and/or the method further comprises the steps of providing an opening device mounted on said tub near said multi-compartment goblet and configured to cut said thin tube of said packaging casing, at one of said first and second ends, of cutting said thin tube of said packaging casing, at one of said first and second ends, of providing a rack mounted on said tub near said opening device and which has a plurality of cut-outs each configured to hold in an upright position a thin tube of a said packaging casing that is open at one of said first and second ends, said rack being configured such that the receiving region of said thin tube is immersed in the liquid zone of said bath of cryogenic agent, and mounting said cut thin tube in a said cut-out of said rack.

BRIEF DESCRIPTION OF THE DRAWINGS

The disclosure of the invention will now be continued with the detailed description of embodiments, given below by way of non-limiting illustration, with reference to the appended drawings. In these.

DETAILED DESCRIPTION OF EMBODIMENTS

Figure 1:
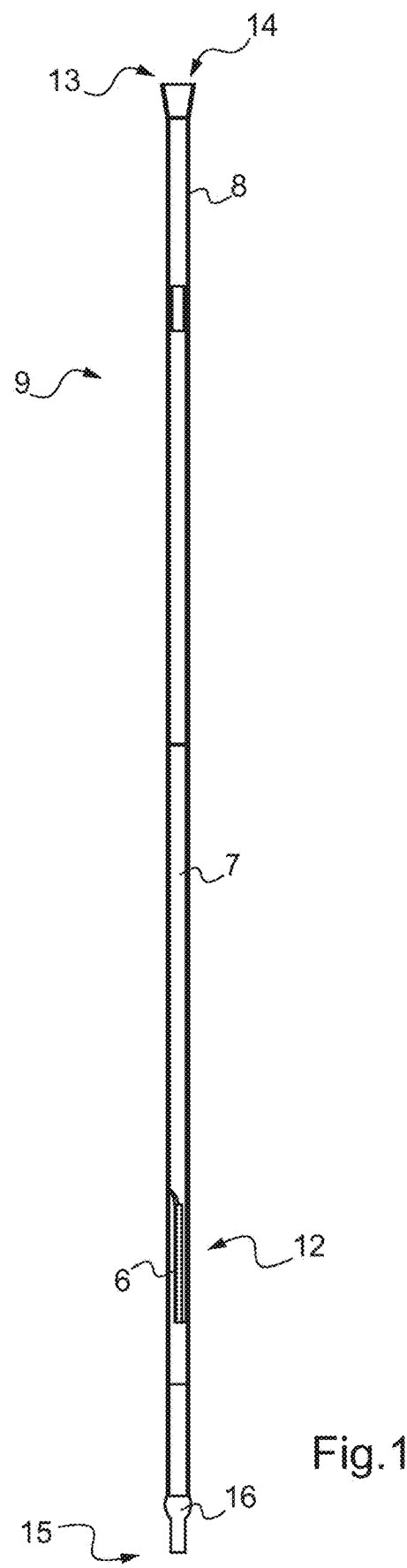
FIG. 1 illustrates a casing for packaging a substance comprising biological material to vitrify, here in cross-section view.

FIG. 1 illustrates a packaging set which comprises a packaging casing for a substance comprising biological material to preserve by cryogenic vitrification, and a receiving carrier for the substance configured to be inserted into that casing.

The biological material that the substance comprises is for example an embryo or an oocyte which it is wished to store and preserve.

In addition to biological material, the substance to vitrify here comprises a cryoprotectant with which the biological material is mixed in advance. The cryoprotectant makes it possible to avoid the deterioration of the biological material during cryogenic processing, in particular through formation of ice crystals.

The packaging casing is here a vitrification straw 9 configured to be plunged into a bath of cryogenic agent, for example liquid nitrogen, after a certain volume of that substance has been introduced into the straw 9.

The liquid cryogenic agent is liquid nitrogen here.

The straw 9 comprises a thin tube 8 of predetermined dimensions. The thin tube 8 in particular has an outside diameter, and inside diameter and a length that are predetermined. The thin tube 8 has an opening 14 at a first end 13 and, in the neighborhood of a second end 15 that is an opposite end to the first end 13, a weld 16 closing off the thin tube 8.

The thin tube 8 here is of a polymer material chosen for example from the ionomer resin for their good mechanical strength properties, their behavior with respect to the cold and their capacity to be easily welded while providing good sealing.

The receiving carrier here comprises a shank 7 having an end portion forming a channel-shaped member 6 configured to receive a predetermined volume of the substance to vitrify.

The shank 7 is configured to be inserted into the thin tube 8 of the straw 9 so as to occupy a predetermined position in which the channel-shaped member 6, and therefore the volume of substance received in the channel-shaped member 6, is located in a receiving region 12 of the thin tube 8 located at a distance from its opening 14.

The receiving region 12 is located between the opening 14 and the weld 16, here near the second end 15 of the tube 8.

It will be noted that in FIG. 1, in which the whole of the straw 9 is shown in a vertical position, the opening 14 is located in the upper part of the straw 9 while the receiving region 12 is located in the lower part of the straw 9.

A description will now be given with reference to FIGS. 2 to 13 of a vitrifying system configured to enable the vitrification and the devitrification of such straws 9.

The vitrifying system 1 comprises a tub 10 configured to contain a bath 11, that is to say a certain volume, of cryogenic agent.

The tub 10 here has a substantially parallelepiped shape and comprises a bottom wall 19, two transverse walls 20 extending facing each other from the bottom wall 19, and two longitudinal walls 21 extending facing each other and meeting the bottom wall 19 and each of the transverse walls 20.

The bottom wall 19, transverse walls 20 and longitudinal walls 21 together delimit an internal space 22 of the tub 10 configured to receive the bath 11 of nitrogen.

The tub 10 furthermore has an upper edge 24, which is a remote edge relative the bottom wall 19 and delimits an opening 23 by which the internal space 22 is open.

The bath 11 of nitrogen has a liquid zone 17 in which the nitrogen is in the liquid state and a gaseous zone 18, surmounting the liquid zone 17, in which the nitrogen is in the gaseous state.

Figure 4:
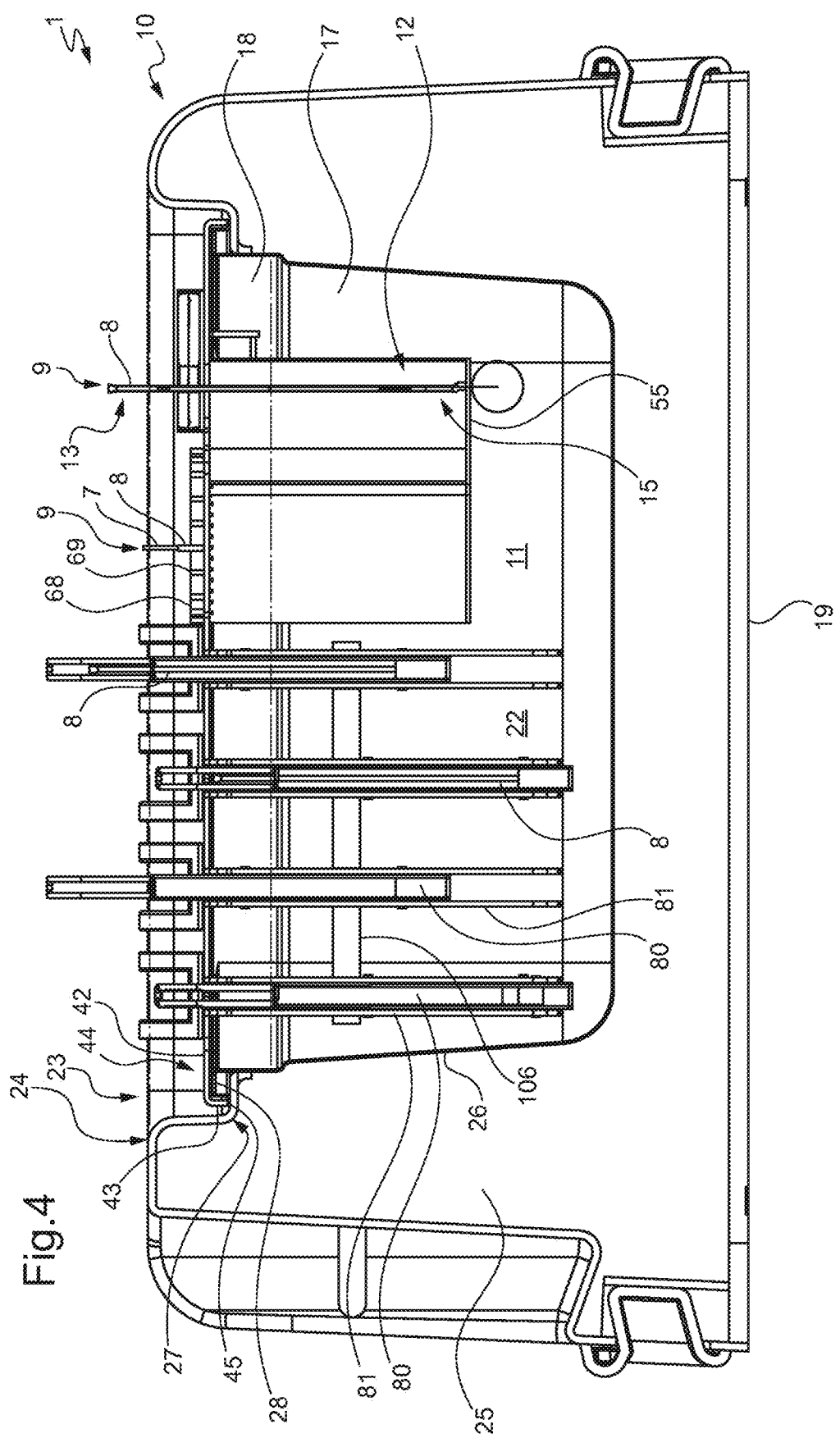
FIG. 4 illustrates the vitrifying system in a cross-section identified by IV-IV in FIG. 2.

The upper levels which the liquid zone 17 and the gaseous zone 18 can attain in the tub 10 are represented in chain line in FIG. 4 and also in FIGS. 10 to 13.

The gaseous nitrogen present in the gaseous zone 18 comes from the evaporation of the liquid nitrogen which occurs in an environment of use of the vitrifying system 1, in which the ambient temperature is considerably different from the temperature of the liquid zone of the nitrogen. This ambient temperature may for example be comprised between approximately 10° C. and 25° C.

In the gaseous zone 18, the volume of gaseous nitrogen issuing from the liquid nitrogen flushes the ambient air then, on account of the fact that the gaseous nitrogen is at negative temperature and thus heavier than the ambient air, has a tendency to overflow from the tub 10 by passing over its upper edge 24, and to spill towards the base of the tub 10.

In other words, the level of gaseous nitrogen in the tub 10 and in particular the upper and lower levels of the gaseous zone 18, are determined respectively by the position of the upper edge 24 and by the upper level of the liquid zone 17.

Furthermore, it will be noted that on account of the evaporation of the liquid nitrogen, the volume of nitrogen present in the liquid zone 17 tends to reduce over time, such that the upper level of the liquid zone 17 tends to fall within the tub 10 during this operation.

The tub 10 is provided with an insulating external wall 25 and with a fluid-tight internal wall 26 delimiting at least partly the internal space 22. The fluid-tight internal wall 26 is here fitted by insertion into the insulating outside wall 25.

On the top of the tub 10, the insulating external wall 25 has an internal shoulder 27, while the fluid-tight internal wall 26 has an external extension 28. The external extension 28 is here disposed bearing on the internal shoulder 27 of the insulating external wall 25.

Each of the bottom wall 19 and the transverse walls 20 and longitudinal walls 21 of the tub 10 is formed by a respective portion of the fluid-tight internal wall 26 and a respective portion of the insulating external wall 25 extending along each other.

The fluid-tight internal wall 26 delimits part of the internal space 22 provided to receive at least the liquid zone 17 of the bath 11. The fluid-tight internal wall 26 is thus formed from a material that is fluid-tight to liquid nitrogen and resistant to very low temperatures.

The insulating external wall 25 is formed from an insulating material so as to limit the exchanges of heat between the liquid nitrogen and the environment outside the tub 10 through the bottom wall 19 and the transverse walls 20 and longitudinal walls 21 of the tub 10.

The tub 10 thus has two gripping handles formed by recesses 29 provided in the transverse walls 20, as well as a removable cover 30 which is configured to be mounted on the upper edge 24 of the tub to close off its opening 23. The cover 30 is shown here removed from the upper edge 24 and temporarily mounted on one of the longitudinal walls 21.

The tub 10 furthermore has a recess 33 provided in one of the transverse walls 20 and which extends from the upper edge 24 towards the bottom wall 19, as well as a bracket 34 mounted on the transverse wall 20 and extending within the recess 33.

The bracket 34 is provided with a plurality of apertures 35 configured to bear work tools such as a test tube, a flask or a pipette.

The vitrifying system 1 further comprises a plurality of individual racks 36 for straws 9 each configured to be demountably hooked onto the upper edge 24 of the tub 10.

Each individual rack 36 comprises a holding portion 37 for holding the straws 9 and a hook 38 which projects from the holding portion 37 and which is configured to hook onto the upper edge 24.

The holding portion 37 has the shape of a half-disk having at its periphery a curved face in which several cut-outs 40 are provided. Each cut-out 40 is configured to hold, in an upright position, a thin tube 8 of a straw 9 engaged with force in the cut-out 40.

The vitrifying system 1 further comprises a cover 41, here of metal, mounted on a rim 44 of the tub 10, which rim 44 is here formed by the external extension 28 of the fluid-tight internal wall 26.

The cover 41 has substantially the form of a rectangular sheet of metal, having a central panel 42 and a turned-down rim 43 extending transversely to the central panel 42 from an outside of that central panel 42.

The turned-down edge 43 bears on a terminal portion 45 of the external extension 28, which bears on the internal shoulder 27 of the insulating external wall 25.

Most of the central panel 42 of the cover 41 extends at least partly facing the bottom wall 19, and therefore extends over the liquid zone 17 when the tub contains the nitrogen bath 11.

The cover 41 is positioned here in the gaseous zone 18 of the nitrogen bath 11.

It could also be considered that the cover is mounted on the rim of the tub and extends over the bath of cryogenic agent, above the gaseous zone and below the ambient air zone, so as substantially to form a barrier between the gaseous zone of the bath of cryogenic agent and the ambient air.

The cover 41 furthermore has an opening 46 provided in the central panel 42 and open on both sides of the latter.

The cover 46 here comprises a transit part 47, a storage part 48, a cutting part 49, an extraction part 50 and four vitrification parts 51.

The opening 46 further comprises a path-forming part 52 passing within the transit part 47, the cutting part 49 and the extraction part 50.

The transit part 47 extends longitudinally between a first side 53 and a second side 54 which is an opposite side to the first side 53.

The cover 41 is mounted here on the tub 10 such that the first side 53 is oriented towards one of the transverse walls 20 of the tub 10, whereas the second side 54 is oriented towards the other of the transverse walls 20 of the tub 10.

The storage part 48 extends as an extension of the transit part 47 from its second side 54.

Each vitrification part 51 extends from the transit part 47, transversely to the latter. Each vitrification part 51 opens into the transit part 47, at a distance from the storage part 48.

The cover 41 has a lug 104 extending in each vitrification part 51, towards the transit part 47, from a respective opposite end of the vitrification part 51 to the transit part 47.

Each vitrification part 51 here extends towards one of the longitudinal walls 21 of the tub 10. Here the vitrification parts 51 all extend on the same side of the transit part 47.

The vitrification parts 51 are longitudinally aligned and regularly spaced relative to each other.

The extraction parts 50 and cutting part 49 are disposed in alignment with the vitrification parts 51 and are located towards the storage part 48. The vitrification parts 51, cutting part 49 and extraction part 50 are all here located on the same side relative to the transit part 47.

The cutting part 49 is of substantially circular shape.

The extraction part 50 is of substantially rectangular shape.

The cover 41 further comprises a partition wall 55 extending from the central panel 42, within the internal space 22, so as to form a space that is substantially closed laterally within the internal space of the tub 10, under the cutting, extraction and conveying parts 49, 50, 52 provided in the opening 46.

The partition wall 55 has an opening in the form of a thin strip 56 substantially vertically oriented, for the entry of the straws into the space of the tub 10 delimited by that partition wall 55.

The vitrifying system 1 further comprises a multi-compartment goblet 60 configured to transport a plurality of straws 9, and a receiving carrier 57 mounted on the cover 41 and configured to hold the goblet 60 in a predetermined orientation.

The receiving carrier 57 is mounted on the cover 41 at the location of the storage part 48 of the opening 46, while being at least partly housed in the tub 10.

The multi-compartment goblet 60 has a cylindrical shape and, disposed inside, has a plurality of tubules 61 each defining a reception housing for straws 9.

The receiving carrier 57 comprises a cylindrical drum 58 configured to removably receive the goblet 60 through an opening 63 that opens through the top of the drum 58, and two rails 59 on which the drum 58 is rotatably mounted.

Each rail 59 is fastened by one end to the central panel 42 of the cover and extends longitudinally and substantially vertically within the internal space 22 of the tub 10.

The receiving carrier 57 further comprises a shaft handle 62 fastened onto the cylindrical drum 58.

Figure 2:
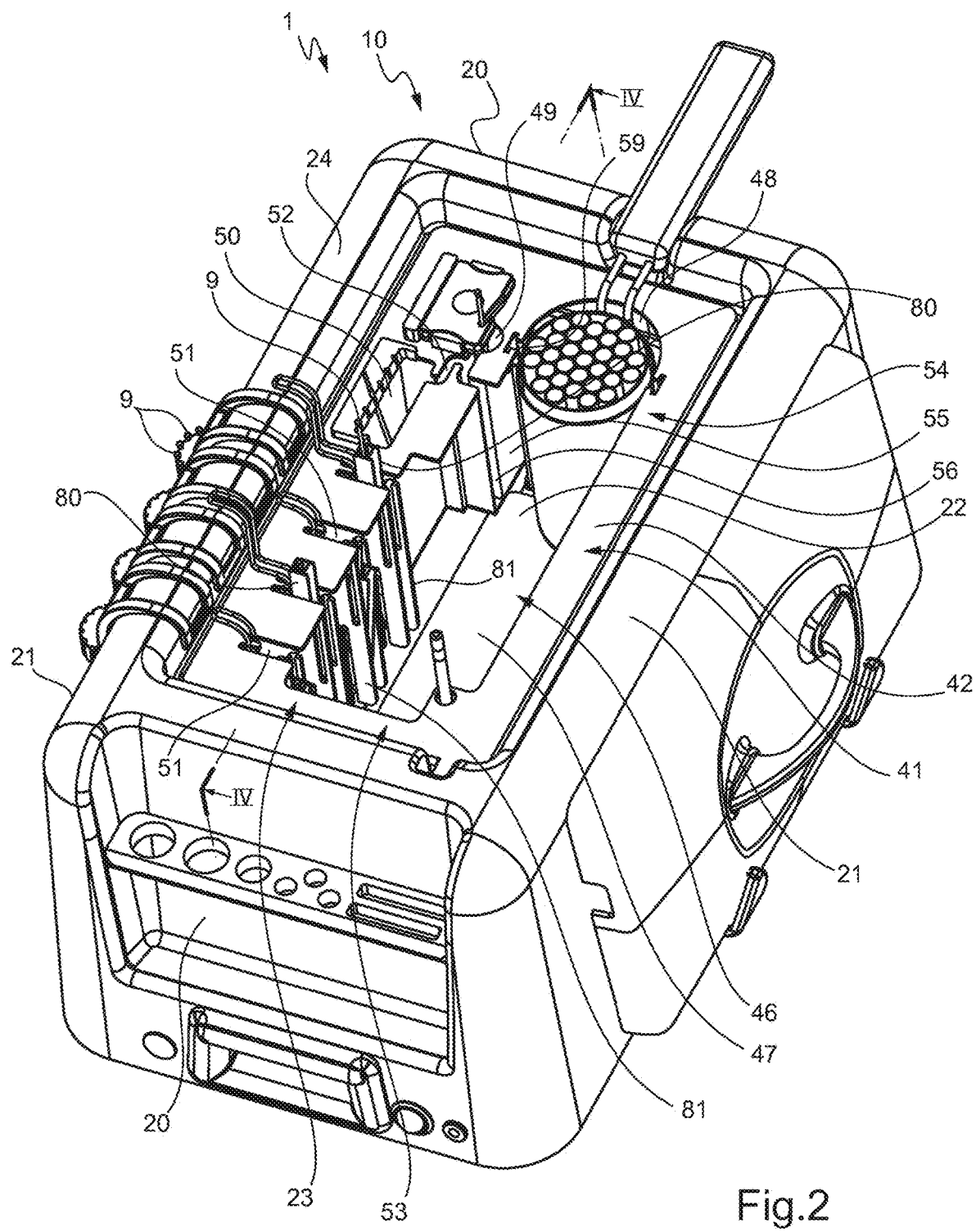
FIG. 2 is a diagrammatic representation in perspective of a vitrifying system in accordance with the invention, configured to vitrify the substance contained in the packaging casing illustrated in FIG. 1, here in a first configuration designated vitrification/devitrification configuration.

In FIG. 2, the receiving carrier 57 is illustrated in a storage position in which the multi-compartment goblet 60 is situated substantially vertically. The system is then in a first configuration referred to as straw vitrification or devitrification configuration.

Figure 3:
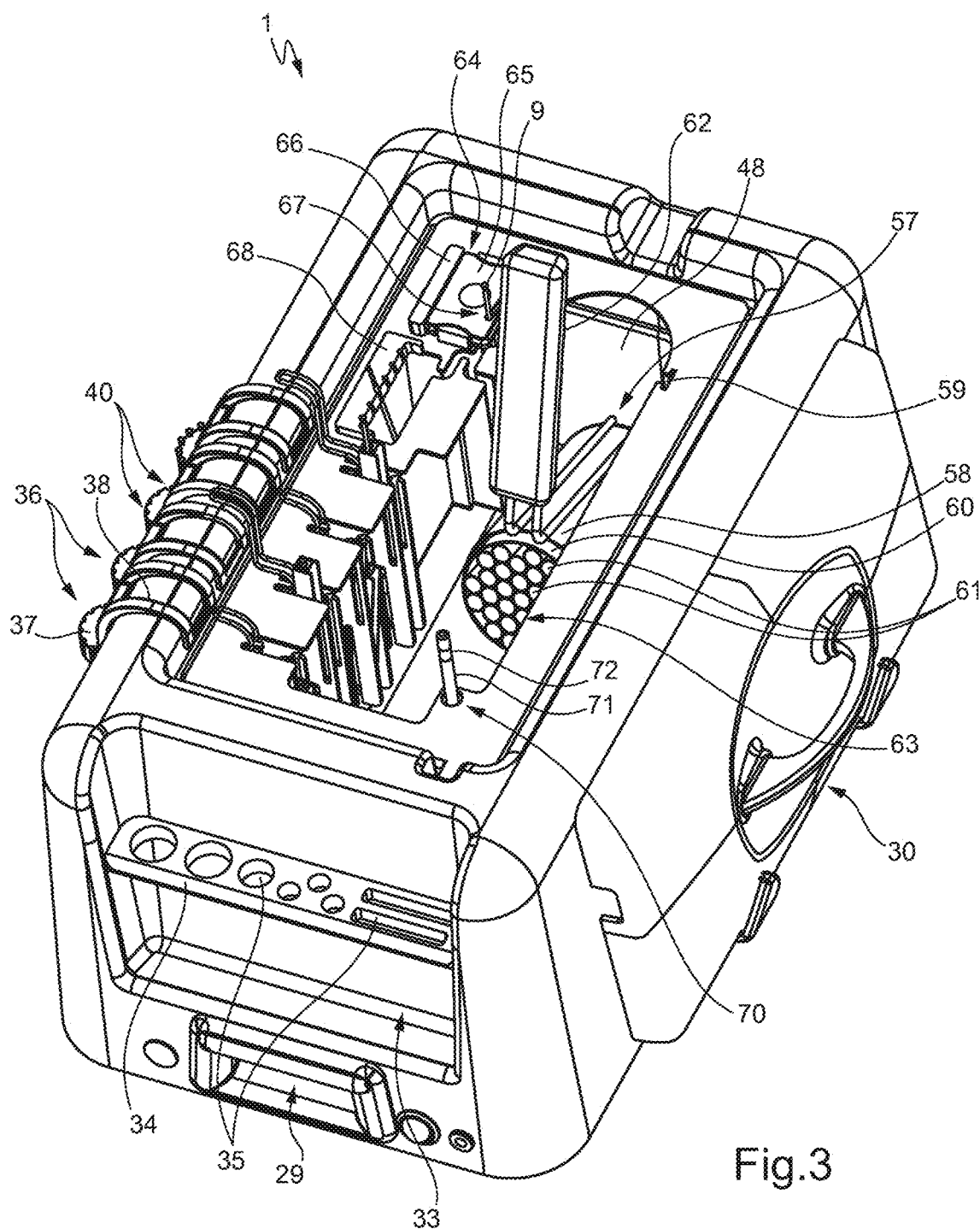
FIG. 3 is a similar view to that of FIG. 2, the vitrifying system here being in a second configuration designated filling/emptying configuration.

In FIG. 3, the receiving carrier 57 is illustrated in a filling/emptying position in which the multi-compartment goblet 60 is inclined and at least partly immersed in the liquid zone 17 of the nitrogen bath 11. In this position, the opening 63 of the drum 58 opens at least partly into the internal space 22 of the tub 10. The system is then in a second configuration referred to as straw filling or emptying configuration.

The receiving carrier 57 is configured such that a user, by grasping the shaft handle 62, is able to pivot the drum 58 on the rails 59 to pass it from the filling/emptying position to the storage position, and vice-versa.

In other words, the receiving carrier 57 is rotatable between the filling/emptying position and the storage position.

It will be noted that in each of the filling/emptying positions and storage position, the thin tube 8 of a straw 9 received in the multi-compartment goblet has its receiving region 12 immersed in the liquid zone 17 of the nitrogen bath 11.

The system 1 further comprises an opening device 64 mounted on the cover near the multi-compartment goblet 60.

More specifically, the opening device 64 is mounted on the cover at the location of the cutting part 49 of the opening 46.

The opening device 64 comprises a body 65, here substantially of parallelepiped shape, having a hinge 66 on a first side, by which the body 65 is pivotally mounted on the cover 41, and a cutting member 67, or cutter, on a second side that is opposite the first side and thus opposite the hinge 66.

The opening device 64 is configured to adopt two stable positions, which are a raised position in which the body 65 is substantially vertically oriented and the cutting member 67 is at a distance from the cutting part 49 and a recumbent position in which the body 65 is substantially horizontally oriented and the cutting member 67 is situated adjacent the cutting part 49.

The opening device 64 is configured to cut the thin tube 8 of a straw 9 received in the cutting part 49 at its first end 13.

The system 1 further comprises a rack 68 mounted on the cover 41 near the opening device 64. The rack 68 has a plurality of cut-outs 69 each configured to hold, in an upright position, the thin tube 8 of a straw 9, which has possibly been opened at its first end 13, while keeping the receiving region 12 of the thin tube 8 immersed in the liquid zone 17 of the nitrogen bath 11.

The system 1 further comprises a device 70 for checking the level of the liquid zone 17 of the nitrogen bath 11. The checking device 70 comprises a floating rod 71 configured to be partially immersed in the liquid nitrogen, and a guide tube (not visible) mounted on the cover 41 and in which the rod 71 is received for sliding in a substantially vertical direction. The rod 71 is provided with a visible indicator 72 enabling the user to deduce the current level of liquid nitrogen in the tub 10.

The system 1 further comprises a plurality of carrier members 80, here four, each being configured to hold the thin tube 8 of a straw 9 in a predetermined orientation and for being mounted on the tub 10.

Here, these carrier members 80 are additionally mounted on the tub 10 via the cover 41, which is to that end provided with four guide rails 81.

Each guide rail 81 is fastened to the central panel 42 by one end, at the location of a vitrification part 51 of the opening 46, and extends longitudinally and substantially vertically or slightly inclined within the internal space 22 of the tub 10.

It will be noted that each guide rail is thus mechanically connected to the tub 10, here via the cover 41.

Each carrier member 80 is configured to be mounted on a guide rail 81 in two distinct predetermined positions, respectively a first predetermined position referred to as high position and a second predetermined position referred to as low position, which is lower, or less high, than the first predetermined position.

Each carrier member 80 is configured to be raised from its low position to its high position.

The carrier members 80 are configured to be slidingly mounted on the guide rails 81.

Each carrier member 80 is thus moveably mounted on and through the cover 41.

More specifically, each carrier member 80 is moveably mounted on a guide rail 81 in a substantially vertical direction to pass from the low position to the high position, and vice-versa.

As illustrated in FIGS. 5 to 8, each carrier member 80 comprises a body 79, here of metal, in the shape of a U having a back wall 78 and facing lateral flanges 77 together defining a housing 83 for the thin tube 8 of a straw 9.

The body 79 extends longitudinally between an upper end 84 and a lower end 85 which is an opposite end to the lower end 84.

The housing 83 is open longitudinally opposite the back wall 78 by a lateral opening 88 configured to receive the thin tube 8 for its insertion into the housing 83.

The body 79, and therefore the opening 88, are oriented substantially vertically when the carrier member 80 is mounted on the guide rail 81, such that the thin tube 8 is inserted into and/or extracted from the housing 83 here while uprightly oriented.

The body 79 furthermore has an upper end wall 86 and a lower end wall 87 each extending transversely and meeting the back wall 78 and each of the lateral flanges 77, and being respectively located at the upper end 84 and the lower end 85.

Each carrier member 80 furthermore has a retaining hook 90, here formed by an L-shaped cut-out formed in the upper end wall 86 of the body 79.

The body 79 furthermore has, at the lower end 85 of the body 79, a closing wall 89 that extends facing the back wall 78 and meets each of the lateral flanges 77, so as to delimit part of the housing 83.

The body 79 furthermore has a first boss 91 provided on the closing wall 89 and projecting into the housing 83, as well as a second boss 92 provided on the back wall 78, projecting into the housing 83, and located away from the first boss 91 towards one of the lower and upper ends of the body 79.

Figure 5:
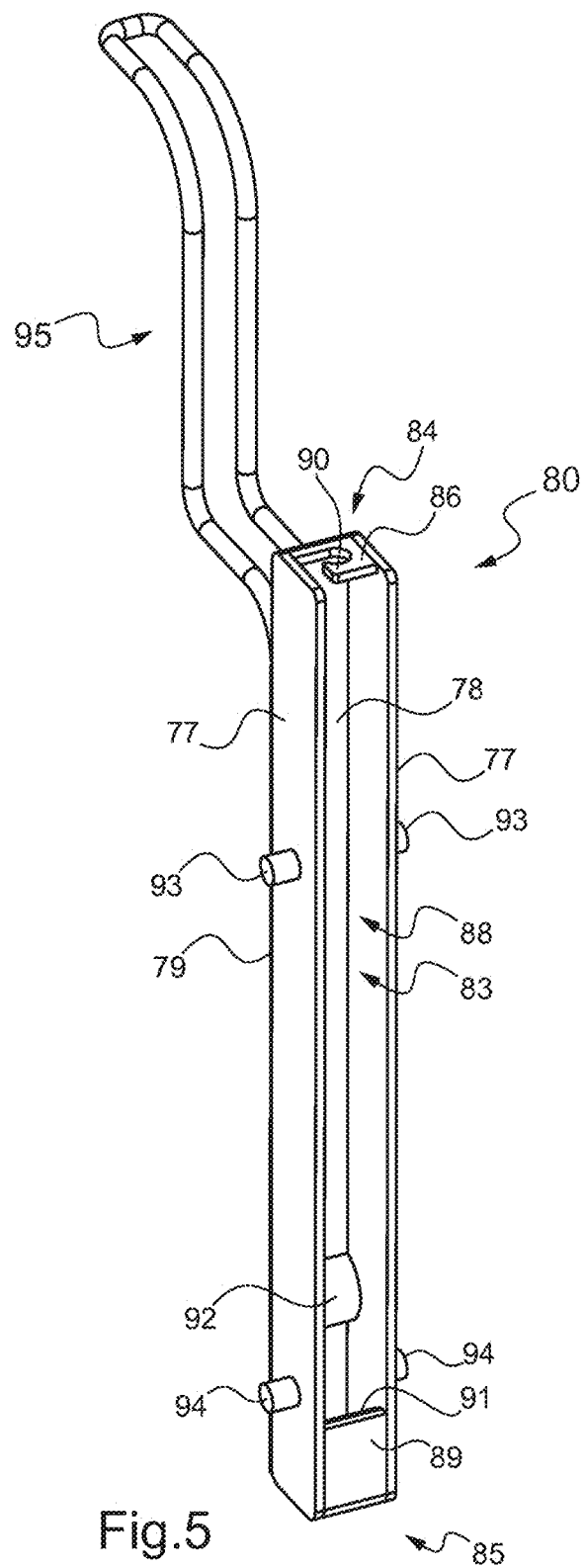
FIGS. 5 to 7 diagrammatically represent in perspective and in isolation, a carrier member of the vitrifying system illustrated in FIGS. 2 to 4, viewed from different angles.
Figure 6:
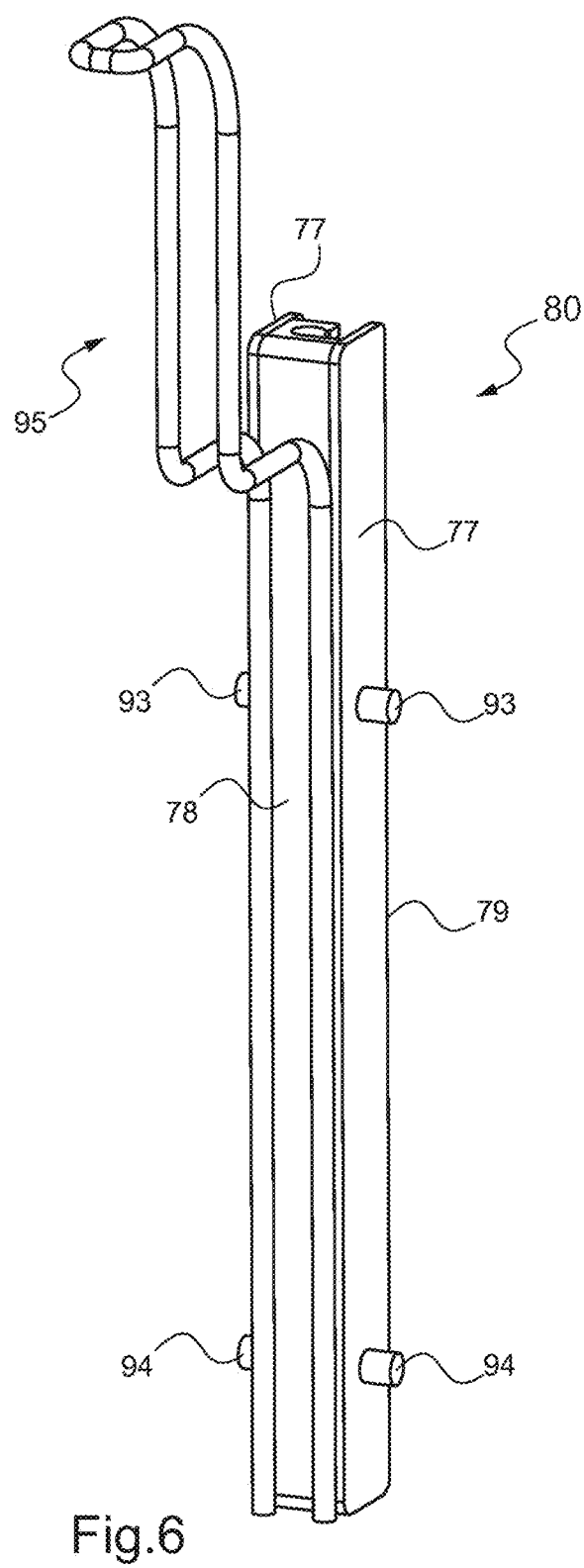
Figure 7:
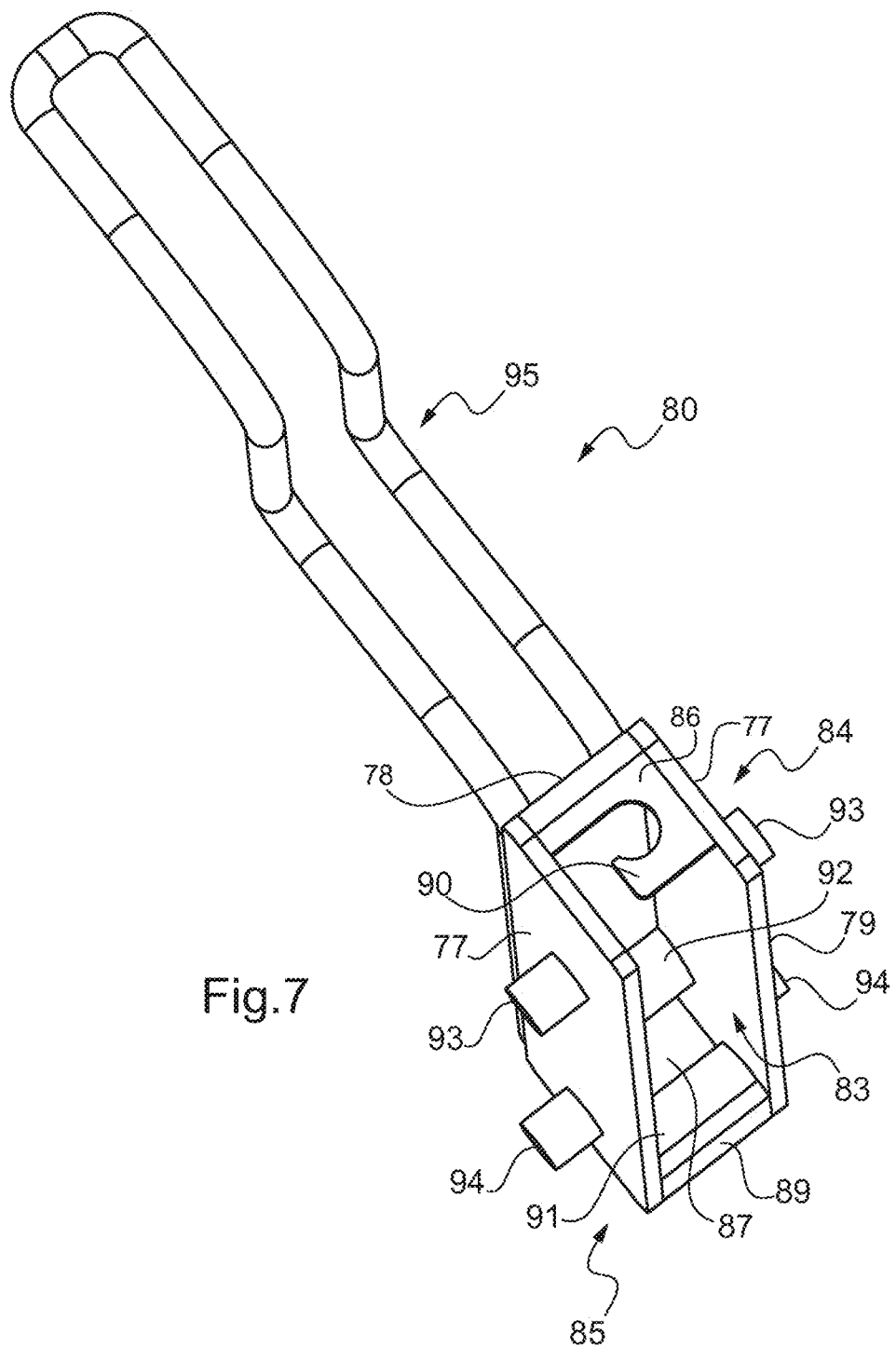

In the carrier member 80 illustrated in FIGS. 5 to 7, the second boss 92 is located towards the upper end 84 of the body 79.

Figure 8:
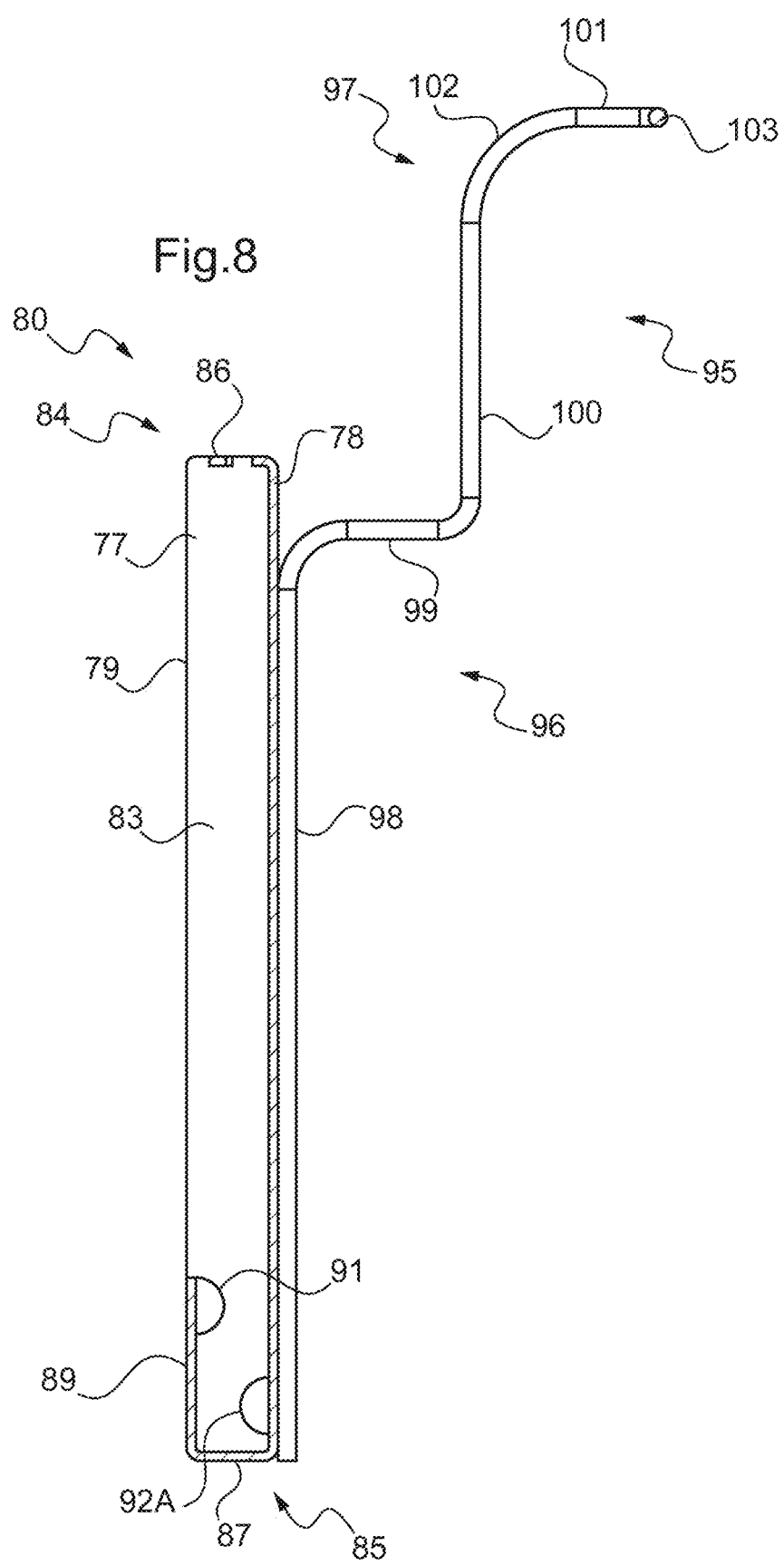
FIG. 8 shows a variant embodiment of the carrier member illustrated in FIGS. 5 to 7, here in longitudinal cross-section view.
Figure 9:
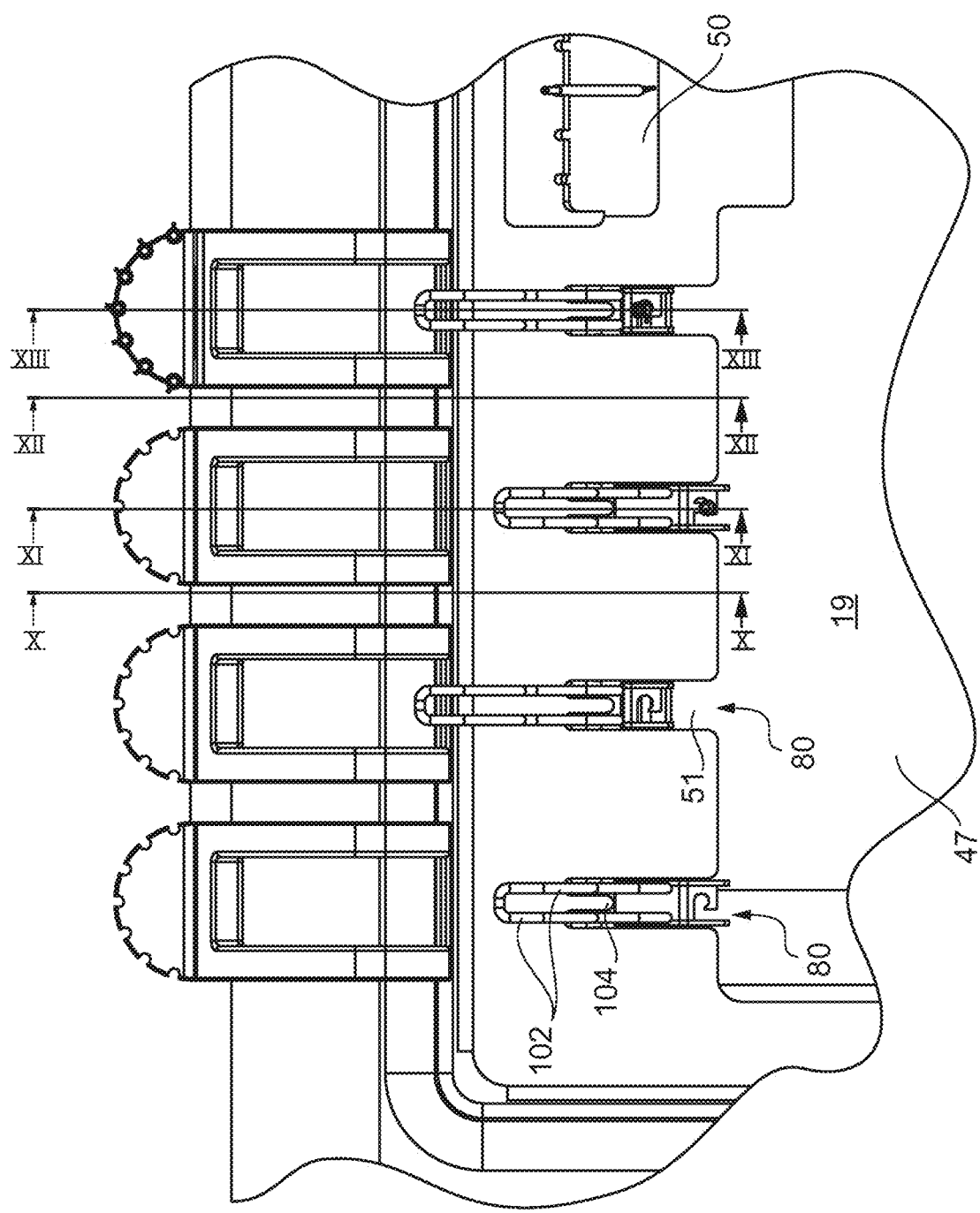
FIG. 9 is a diagrammatic partial representation of a top view of the vitrifying system illustrated in FIGS. 2 to 4.

In a variant embodiment of the carrier member, illustrated in FIG. 8, the second boss 92A is located towards the lower end 85 of the body 79.

When the straw 9 is inserted into the carrier member 80, a lower portion of the thin tube 8 is engaged between the bosses 91 and 92, while an upper portion of the thin tube 8 is engaged in the retaining hook 90.

The thin tube 8 is thus confined in position on the carrier member 80 while being at least partly bent longitudinally between one and/or the other of the bosses 91 and 92 and the retaining hook 90.

The bosses 91 and 92 thus form two parts for wedging the thin tube 8, one of which is located towards a lower end of the tube 8 and the other of which is located towards an upper end of the tube 8 which is an opposite end to its lower end.

Each carrier member 80 furthermore has upper projections 93 located in the neighborhood of the upper end 84 of the body 79, and lower projections 94 located in the neighborhood of the lower end 85 of the body 79.

The upper and lower projections 93 and 94 are all provided on the outside of the body 79.

The upper and lower projections 93 and 94 are provided here on the lateral flanges 77 and are disposed on either sides of the body 79.

The upper and lower projections 93 and 94 all have a cylindrical shape here.

Each carrier member 80 further comprises a shaft handle 95 fastened to the body 79 and configured to enable a user to manipulate the carrier member 80.

The shaft handle 95 is formed here by a metal rod shaped into a U, having two arms 102 extending opposite each other and a junction portion 103 linking the lugs.

The shaft handle 95 here has a profile having an L-shaped first portion 96, fastened on the outside of the back wall 78, and an L-shaped second portion 97 extending the first wall 96 on the same side as the upper end 84 of the portion 79.

The L-shaped first portion 96 has a first branch 98 fastened to the back wall 78, for example by welding, and extending along the latter, and a second branch 99 extending the first branch 98 away from the back wall 78.

The second L-shaped portion 97 has a first branch 100 transversely extending the second branch 99 of the first L-shaped portion 96, and a second branch 101 transversely extending the first branch 100 away from the back wall 78.

As illustrated in FIGS. 9 to 13, the guide rails 81 are all identical here, such that the following description of a guide rail 81 applies for the other guide rails 81.

The guide rail 81 extends longitudinally between an upper end 107 by which it is fastened to the central panel 42 of the cover 41, and a lower end 108 disposed facing the bottom wall 19 of the tub 10.

The guide rail 81 is of metal here and is welded to the central panel 42.

The guide rail 81 is formed by two mounting walls 105 extending longitudinally facing each other. The mounting walls 105 are each fastened to the central panel 42, on opposite sides of the vitrification part 51 under which that rail 81 is fastened.

The cover 41 here has a rigidifying bar 106 mechanically connected to each of the mounting walls 105, so as to rigidify the assembly formed by that bar 106 and the mounting walls 105.

The mounting walls 105 are arranged here so as to be the mirror image of each other.

The guide rail 81 has lower cut-outs 109 each provided in a lower portion 117 of the guide rail 81 extending from its lower end 108.

Each lower cut-out 109 is provided in a respective mounting wall 105 and extends substantially vertically, opposite the lower cut-out 109 of the other mounting wall 105.

Each lower cut-out 109 opens in the neighborhood of the lower end 108 of the guide rail 81.

Each lower cut-out 109 is configured to slidingly receive a lower projection 94 of the carrier member 80, when the latter is mounted on the guide rail 81.

The guide rail 81 furthermore has upper cut-outs 110 each provided in an upper portion 118 of the guide rail 81 extending from its upper end 107 to the lower portion 117.

Each upper cut-out 110 is provided in a respective mounting wall 105 and extends opposite the other upper cut-out 110.

Each upper cut-out 110 has a first portion 113 extending substantially vertically and a second portion 114 extending substantially horizontally and opening into the first portion 113 in the neighborhood of the upper end 107 of the guide rail 81.

In the first portion 113, the upper cut-out 110 has a low bottom 115 located at a distance from the upper end 107.

In the second portion 114, the upper cut-out 110 has a high bottom 116 located in the neighborhood of the upper end 107. The second portion 114 here has a downwardly curved shape.

Each upper cut-out 110 furthermore has an insertion portion 111, located in the neighborhood of the upper end 107 of the guide rail 81, transversely extending the first portion 113 and opening frontally into the internal space 22.

Each upper cut-out 110 is configured to slidingly receive an upper projection 93 of the carrier member 80, when the latter is mounted on the guide rail 81.

This upper projection 93 is inserted into the upper cut-out 110 via the insertion portion 111.

Each carrier member 80 is configured to be mounted on a guide rail 81 with the body 79 received between the mounting walls 105, the lower projections 94 being received in the lower cut-outs 109 and the upper projections 93 being received in the upper cut-outs 110.

It will be noted that the lug 104 of the cover 41 is received between the arms 102 of the shaft handle 95.

Figure 10:
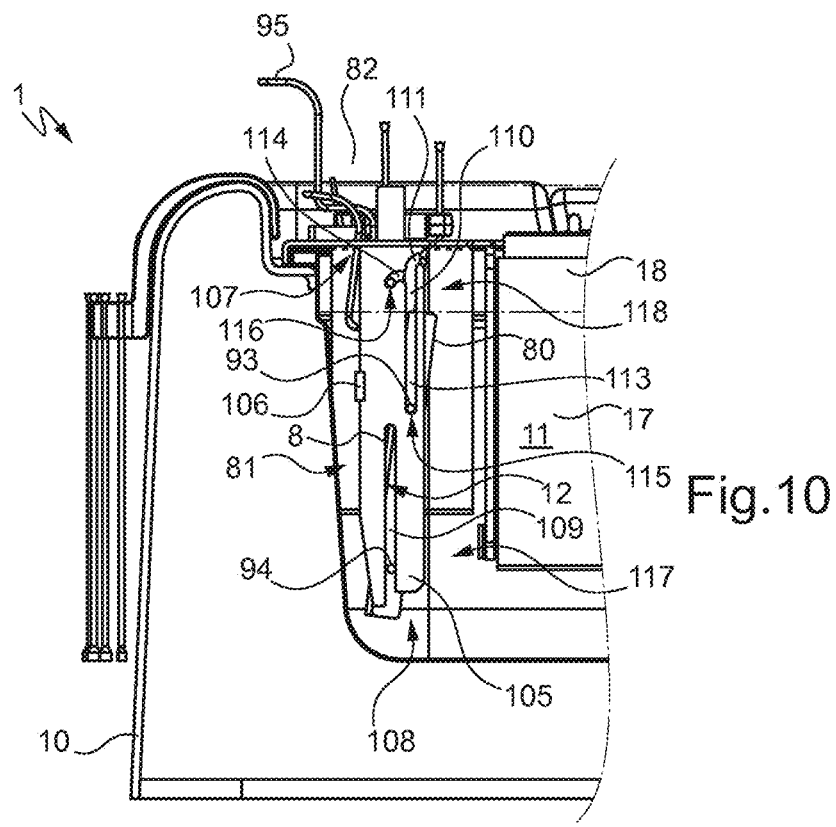
FIGS. 10 to 13 are cross-section views respectively identified by X-X, XI-XI, XII-XII and XIII-XIII in FIG. 9.
Figure 11:
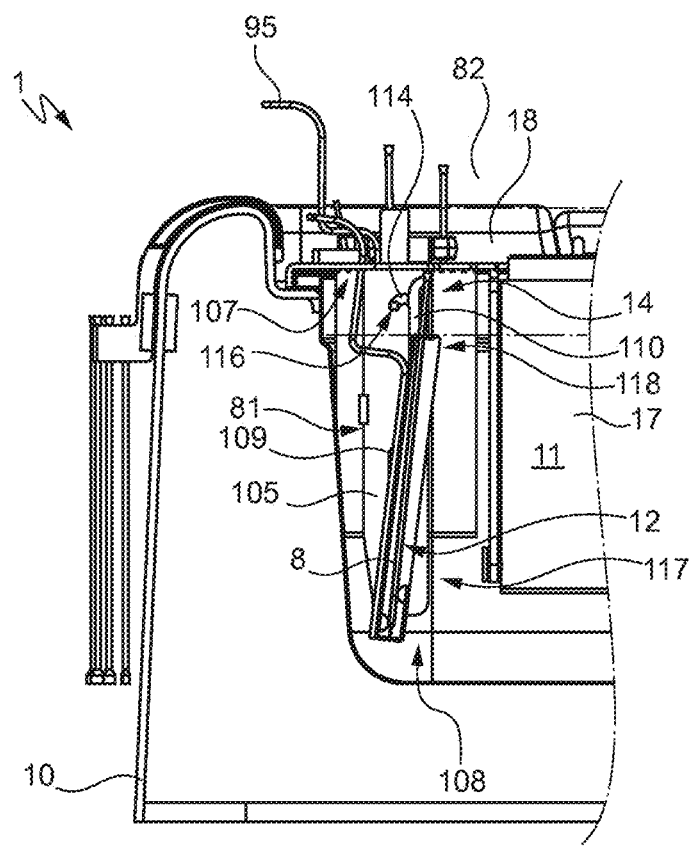

In FIGS. 10 and 11, a carrier member 80 is mounted in lower position, or second position, on a guide rail 81, a straw 9 being received in that carrier member 80.

In this low position, the upper projections 93 each rest on the low bottom 115 of the upper cut-outs 110, such that the low bottom 115 defines the low position of the carrier member 80.

In other words, each upper projection 93 forms a low positioning projection while each first portion 113 of an upper cut-out 110 forms a first low positioning cut-out, or an abutment, which is configured to receive a high positioning projection and which defines the second predetermined position.

In this low position, the thin tube 8 has an upright general orientation in the tub 10, the receiving region 12 of the thin tube 8 is immersed in the liquid zone 17, and the opening 14 of the thin tube 8 is located immediately above the liquid zone 17, in the gaseous zone 18 of the nitrogen bath 11, and below the ambient air zone 82 surmounting the nitrogen bath 11.

In this low position, the thin tube 8 has an upright general orientation but presents a slight inclination relative to the vertical.

In this low position, the thin tube 8 is fully in contact with the nitrogen, partially in the liquid zone 17 of the bath 11 and partially in the gaseous zone 18 of the bath 11.

The thin tube 8 is thus cooled over its whole length, from the receiving region 12 of the substance to its opening 14.

The fact that the opening 14 of the thin tube 8 is located in the gaseous zone 18 of the nitrogen bath 11 makes it possible not to fill an internal volume of the thin tube 8 (at least partly dedicated to the substance) with nitrogen in the liquid state but rather with nitrogen in the gaseous state, which is colder than the ambient air, and which thus flushes the ambient air out of the thin tube 8 by convection.

Thus, the thin tube 8 is cooled by the nitrogen not only by direct contact by an outside face of the thin tube 8 with the nitrogen in the liquid state and in the gaseous state, but also by the direct contact by an inside face of the thin tube 8 with the nitrogen in the gaseous state.

Figure 12:
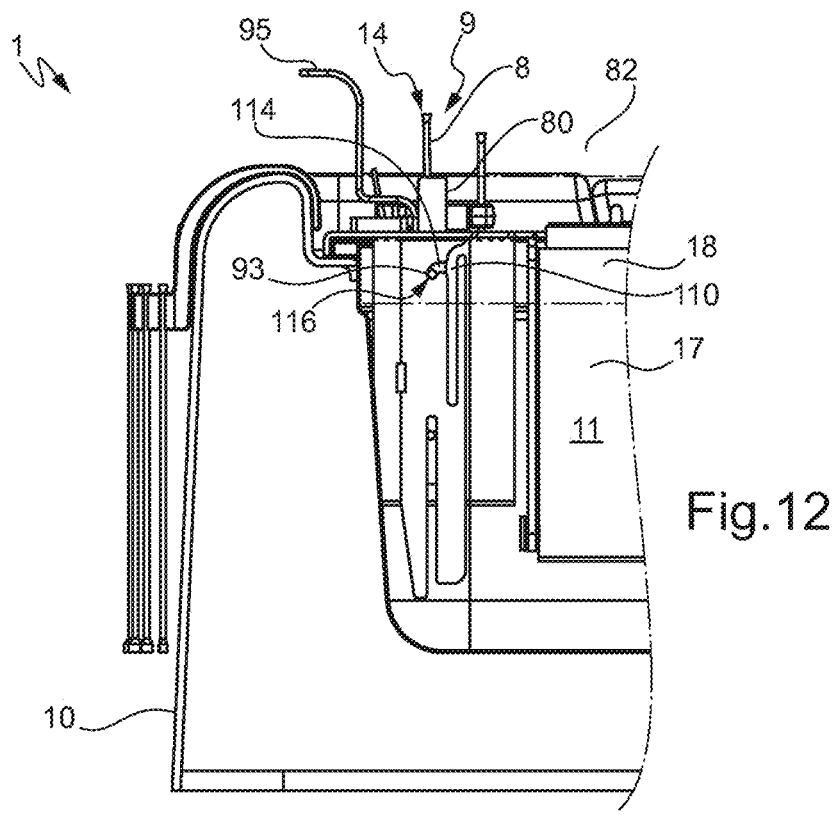
Figure 13:
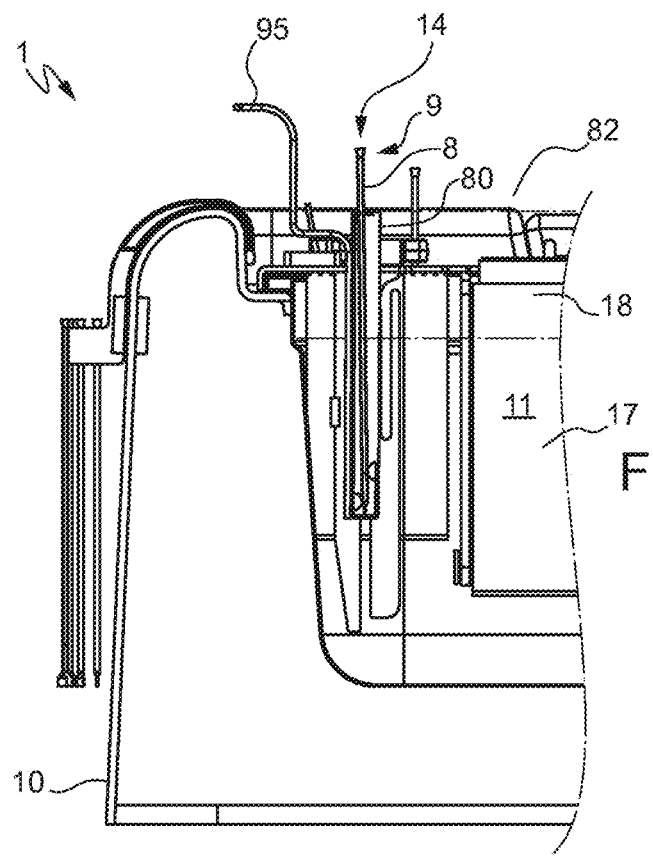

In FIGS. 12 and 13, the carrier member 80 has been raised by a user from its low position (second position) and is located in the upper position, or first position.

In this high position, the upper projections 93 rest on the high bottom 116 of the upper cut-outs 110, such that the high bottom 116 defines the high position of the carrier member 80.

In other words, each upper projection 93 here also forms a high positioning projection while each second portion 114 of an upper cut-out 110 forms a second high positioning cut-out, which is configured to receive a high positioning projection and which defines the first predetermined position.

In this high position, the thin tube 8 of a straw 9 received in the carrier member 80 is upwardly oriented in the tub 10, the receiving region 12 of the thin tube 8 is immersed in the liquid zone 17 of the nitrogen bath 11, and the opening 14 of the thin tube 8 is located above the nitrogen bath 11, in the ambient air zone 82 surmounting the nitrogen bath 11.

The opening 14 is thus located above the gaseous zone 18, here at approximately 20 mm above that zone 18.

In this high position, it is possible to insert the shank 7 provided with the substance to vitrify into the thin tube 8, through its opening 14 which is easily accessible since it is located above the cover.

It will be noted that to pass the carrier member 80 from the low position to the high position, the user here grasps the shaft handle 95 and pulls upwardly until each upper projection 93 comes to face a second portion 114 of an upper cut-out 110, then pulls horizontally to insert the upper projection 93 into that second portion 114.

It will be noted that during this movement, each upper projection 93 and each lower projection 94 is slidingly guided respectively by the first portion 113 of the upper cut-out 110 in which the upper projection 93 is engaged, and by the lower cut-out 109 in which the lower projection 94 is engaged.

The upper projections 93 and lower projections 94 thus form guide projections, while the first portions 113 of the upper cut-outs 110 and the lower cut-outs 109 of a guide rail 81 form guide cut-outs extending substantially vertically and at least partly along the guide rail 81, and are furthermore configured to slidingly receive the guide projections, when the carrier member 80 is moved from its second predetermined position to its first predetermined position.

A description will now be given of a method of vitrification, then devitrification of the substance comprising the biological material to preserve, using the system 1 described above.

The thin tube 8 of a straw 9 is disposed in the carrier member 80 then the latter is mounted on the cover 41 of the tub 10 in low position such that the thin tube 8 is uprightly oriented in the tub 10, with its receiving region 12 immersed in the liquid zone 17 of the nitrogen bath 11, and its opening 14 located immediately above the liquid zone 17, in the gaseous zone 18 of the nitrogen bath 11.

The thin tube 8 is left in this position for a predetermined time in order to be cooled to a desired temperature.

Once the thin tube 8 has attained the desired temperature, the carrier member 80 is raised from the low position to the high position such that the thin tube 8 is uprightly oriented in the tub, with its receiving region 12 still immersed in the liquid zone 17 of the nitrogen bath, and its opening 14 above the nitrogen bath 11, in a zone of the ambient air surmounting the nitrogen bath 11.

The shank 7 of the straw 9, on the channel-shaped member 6 of which was deposited in advance a volume of substance to vitrify, is then introduced into the thin tube 8 by its opening 14 such that the channel-shaped member 6 and the volume of substance received in the channel-shaped member 6, are located in the receiving region 12 of the thin tube 8.

The thin tube 8 is then sealed at its first end 13 using a welding device, while it is still held in the carrier member 80 in high position, the receiving region 12 of the tube 8 thus still being immersed in the liquid nitrogen.

Once the tube 8 has been sealed, the carrier member 80 is brought back to its low position in order for the tube 8 to be again fully immersed in the nitrogen bath 11, partly in the liquid zone 17 and partly in the gaseous zone 18.

The multi-compartment goblet 60 is then inserted into the drum 58 of the receiving carrier 57 while the latter is in the storage position. The multi-compartment goblet 60 is thus situated substantially vertically and is at least partly housed in the tub 10, that is to say at least partly immersed in the nitrogen bath 11.

The receiving carrier 57 is then rotated from its storage position to its filling/emptying position such that the multi-compartment goblet 60 is inclined and at least partly immersed in the liquid zone 17 of the liquid nitrogen bath 11. In particular, in this filling/emptying position, the opening 63 of the drum 58 is at least partly immersed in the liquid zone 17 of the bath 11.

The straw 9, with its thin tube 8 closed off at each of its first and second ends 13 and 15 is then passed from the carrier member 80 in which it is received, which carrier member 80 is in low position, to the multi-compartment goblet 60 while mostly remaining in the nitrogen bath 11, and in particular in the liquid zone 17.

The receiving carrier 57 is then tilted up to the storage position in which the goblet 60 is situated substantially vertically.

The receiving carrier 57 and the goblet 60 are configured such that, in this storage position, at least the receiving region 12 of the thin tube 8 of each of the straws 9 received in the goblet 60 is immersed in the liquid zone 17 of the nitrogen bath 11.

The straw 9 with the vitrified substance can then be transported out of the tub 10 with the goblet 60 in order to be stored in a dedicated place.

To perform the devitrification, the vitrified straw 9 is removed from its storage location and then disposed in the goblet 60.

The goblet 60 is brought in front of the system 1 and inserted into the tub 10, in its receiving carrier 57.

The receiving carrier 57 is pivoted to reach its filling/emptying position in which the goblet 60 is inclined.

The straw 9 is next extracted from the goblet 60 then brought into the part of the internal space 22 of the tub 10 which is delimited by the partition wall 55, passing via the opening in the form of the thin strip 56.

The straw 9 is conveyed by the path 52 to reach the cutting part 49, the opening device 64 being situated in raised position.

The latter is passed from its raised position to its reclining position so as to cut the thin tube 8, by virtue of the cutting member 67, at the location of its first end 13 in order to make the shank 7 accessible.

The opening device 64 is passed from its reclining position to its raised position and the straw 9 with the cut tube 8 is then conveyed from the cutting part 49 to the extraction part 50, where the thin tube 8 is engaged in a reception cut-out 69 of the rack 68 to be held therein. It is therefore possible to remove the shank 7 from tube 8 to retrieve the substance to devitrify.

In variants not shown:
the system comprises more or fewer vitrification parts and these parts may be located differently in the cover and more generally in the tub; for example they may be located on both sides of the transit part;
the system may be configured to position the carrier member and thus the straw in at least one other predetermined position, located for example between the first and second predetermined positions described above, or possibly higher than the first position in which the straw would not be or would practically not be plunged into the liquid zone of the bath, or even on the contrary lower than the second position in which the straw would be fully or practically fully plunged into the liquid zone of the bath;
the opening device and/or the rack are not mounted on the tub via the cover, but are instead directly mounted on the tub;
one of the lateral flanges of the body of the carrier member has no projection;
the guide rail has only one mounting wall;
the positioning projections are provided on the lateral flanges of the guide rail rather than on the body of the carrier member, while the cut-outs are provided in the body of the carrier member rather than in the lateral flanges of the guide rail;
the carrier member is not slidingly mounted on the guide rail but is mounted on the guide rail via a pivoting joint configured in order for the carrier member to be movable and removable, for example via a mechanism with slides;
the tub does not have a parallelepiped shape but another shape, for example cylindrical;
the cover may be differently arranged on the tub and the vitrification, transit, extraction, cutting and storage parts may also be arranged differently relative to each other;
the environment in which the system is used may be a room of which the ambient air may be assimilated to the atmosphere or a room of which the temperature and/or the pressure are controlled.

Numerous other variants are possible according to circumstances, and in this connection it is to be noted that the invention is not limited to the examples described and shown.

The invention claimed is:

1. A system for cryogenic vitrification of a substance, the substance comprising biological material to preserve, the system comprising a packaging casing in which the substance is receivable, and which comprises a thin tube of predetermined dimensions having an opening at a first end and being closed off in the neighborhood of a second end which is an opposite end to said first end, said casing forming part of a packaging set for said substance, the packaging set comprising, in addition to said casing, a receiving member configured to receive a predetermined volume of said substance and to be inserted inside said thin tube such that said predetermined volume of said substance is located in a receiving region of said thin tube located at a distance from said opening of said thin tube;

said system comprising a tub configured to contain a bath of a cryogenic agent and at least one carrier member configured to hold said thin tube in a predetermined orientation and to be mounted on said tub in a first predetermined position in which said thin tube is uprightly oriented in said tub, said receiving region of said thin tube is immersed in a liquid zone of said bath of cryogenic agent where said cryogenic agent is in the liquid state, and said opening of said thin tube is located above said bath of cryogenic agent, in a zone of ambient air surmounting said bath of cryogenic agent, to enable the insertion of said receiving member of said substance into said thin tube;

said system being characterized in that said at least one carrier member is configured to be mounted on said tub in at least one second predetermined position, lower than said first predetermined position, in which second predetermined position said thin tube is uprightly oriented in said tub, said receiving region of said thin tube immersed in said liquid zone, and said opening of said thin tube is located immediately above said liquid zone, in a gaseous zone of said bath of cryogenic agent, surmounting said liquid zone and where said cryogenic agent is in the gaseous state, and below said ambient air zone surmounting said bath of cryogenic agent, and to be raised from said second predetermined position to said first predetermined position.

2. The system according to claim 1, characterized in that it comprises at least one guide rail mechanically connected to said tub, said at least one carrier member being mounted to be movable on said guide rail in a substantially vertical direction to pass from said second predetermined position to said first predetermined position, and vice-versa.

3. The system according to claim 2, characterized in that said at least one carrier member comprises at least one positioning projection and said guide rail comprises a first positioning cut-out and a second positioning cut-out each configured to receive said at least one first projection and which respectively define said first predetermined position and said second predetermined position.

4. The system according to claim 2, characterized in that said at least one carrier member is slidingly mounted on said guide rail.

5. The system according to claim 4, characterized in that said at least one carrier member comprises at least one guide projection and said guide rail comprises at least one guide cut-out extending substantially vertically and at least partly along said guide rail and being configured to slidingly receive said at least one guide projection, when said at least one carrier member is moved from its second predetermined position to its first predetermined position.

6. The system according to claim 1, characterized in that the at least one carrier member comprises a U-shaped body that has a back and facing lateral flanges together defining a housing for said thin tube and said casing, which housing is open longitudinally opposite said back through a lateral opening configured to receive said tube uprightly oriented for its insertion into said housing.

7. The system according to claim 1, characterized in that said at least one carrier member is provided, towards a lower end, with at least one part for wedging said thin tube and, towards an upper end which is an opposite end to its lower end, with a hook for retaining said thin tube.

8. The system according to claim 7, characterized in that said at least one carrier member is configured such that said thin tube is confined in position on said at least one carrier member and at least partly bent longitudinally between said at least one wedging part and said retaining hook.

9. The system according to claim 1, characterized in that said system comprises a cover mounted on a rim of said tub and extending to be situated over said liquid zone, and said at least one carrier member is moveably mounted on and through said cover.

10. The system according to claim 9, characterized in that said cover is positioned in said gaseous zone of said bath of cryogenic agent.

11. The system according to claim 10, characterized in that said tub is provided with an insulating external wall and with a fluid-tight internal wall delimiting at least partly an internal receiving space for the bath of cryogenic agent, said insulating external wall having an internal shoulder provided at the top of said tub, said fluid-tight internal wall having an external extension provided at the top of said tub and disposed bearing on said shoulder of said external wall, said external extension forming said rim of said tub on which is positioned said cover.

12. The system according to claim 1, characterized in that it comprises a multi-compartment goblet configured to transport a plurality of said packaging casings, a receiving carrier at least partly housed in said tub and configured to removably receive said multi-compartment goblet such that at least the receiving region of the thin tube of each of said plurality of said packaging casings is immersed in said liquid zone of said bath of cryogenic agent.

13. The system according to claim 12, characterized in that said receiving carrier of said multi-compartment goblet is rotatable between a storage position in which said multi-compartment goblet is situated substantially vertically and a filling/emptying position in which said multi-compartment goblet is inclined and at least partly immersed in said liquid zone of said bath of cryogenic agent; whereby said system is configured to pass a said packaging casing that is closed off at each of its first and second ends at least from said at least one carrier member to said multi-compartment goblet while remaining mostly immersed in said bath of cryogenic agent.

14. The system according to claim 12, characterized in that it comprises an opening device which is configured to cut said thin tube of said packaging casing, at one of said first and second ends, and which is mounted on said tub near said multi-compartment goblet.

15. The system according to claim 14, characterized in that it comprises a rack mounted on said tub near said opening device and which has a plurality of cut-outs each configured to hold, in an upright position, a thin tube of a said packaging casing, which is open at one of said first and second ends, said rack being configured such that the receiving region of said thin tube is immersed in the liquid zone of said bath of cryogenic agent.

16. The system according to claim 1, characterized in that it comprises a checking device for the level of said liquid zone of said bath of cryogenic agent in said tub.

17. A method of vitrifying a substance, the substance comprising biological material to preserve, using the system according to claim 1, comprising the steps of:
providing the packaging set for said substance comprising the packaging casing having the thin tube of predetermined dimensions having the opening at the first end and being closed off in the neighborhood of the second end that is the opposite end to said first end, and the receiving member configured to receive the predetermined volume of said substance and to be inserted inside said thin tube such that said predetermined volume of said substance is located in the receiving region of said thin tube located at the distance from said opening of said thin tube;
providing the tub containing the bath of cryogenic agent;
providing at least one carrier member configured to be mounted on said tub and to hold said thin tube in the predetermined orientation;
placing said thin tube in said at least one carrier member in said predetermined orientation;
mounting said at least one carrier member on said tub in at least one second predetermined position in which said thin tube is uprightly oriented in said tub, said receiving region of said thin tube being immersed in the liquid zone of said bath of cryogenic agent in which the cryogenic agent is in the liquid state, and said opening of said thin tube being located immediately above said liquid zone, in the gaseous zone of said bath of cryogenic agent, surmounting said liquid zone and where said cryogenic agent is in the gaseous state, and below the ambient air zone surmounting said bath of cryogenic agent;

raising said at least one carrier member from said second predetermined position to the first predetermined position, higher than said second predetermined position, in which said thin tube is uprightly oriented in said tub, said receiving region of said thin tube being immersed in said liquid zone of said bath of cryogenic agent, and said opening of said thin tube being located above said bath of cryogenic agent, in the ambient air zone surmounting said bath of cryogenic agent, to enable the insertion of said receiving member of said substance into said thin tube;

depositing said substance on said carrier and inserting said carrier into said thin tube; and sealing said thin tube at its second end.

* * * * *